Sept. 2, 1941.     H. Z. BENTON     2,254,790
LAMP BRACKET
Filed July 30, 1940
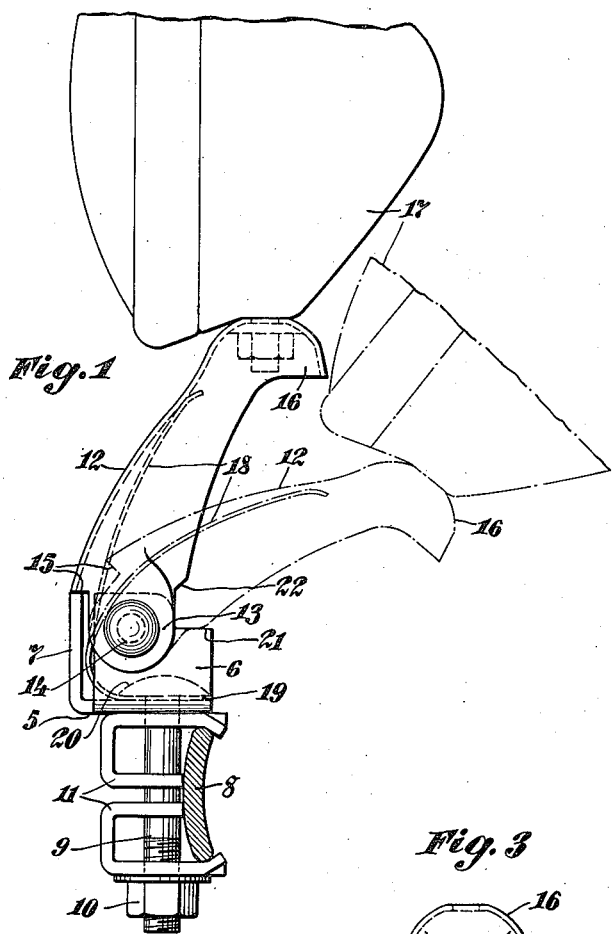
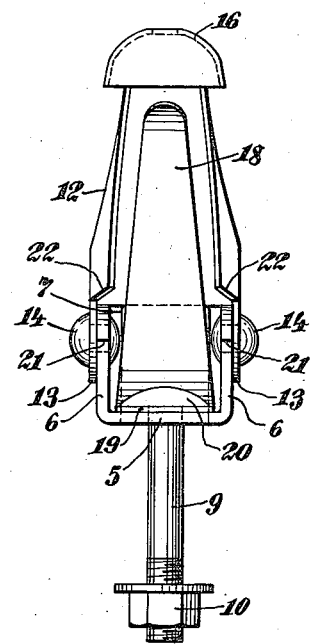
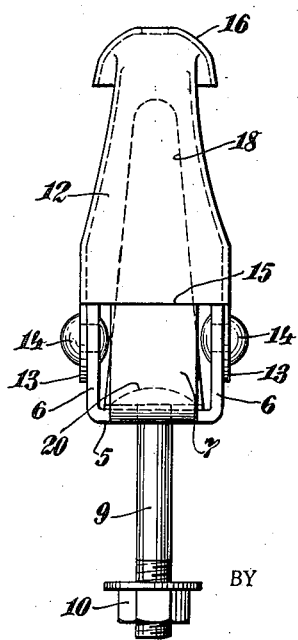
Harold Z. Benton,
INVENTOR.
ATTORNEY.

Patented Sept. 2, 1941

2,254,790

UNITED STATES PATENT OFFICE 2,254,790

LAMP BRACKET

Harold Z. Benton, Glencoe, Ill., assignor to Crowe Name Plate & Manufacturing Co., Chicago, Ill., a corporation of Illinois Application July 30, 1940, Serial No. 348,361

4 Claims. (Cl. 248—226)

The invention here disclosed relates to brackets or supports for automobile lamps, particularly fog lamps, parking lamps and the like, such as are usually mounted on the front bumper.

Objects of the invention are to prevent breakage and injury, such as ordinarily results when one car backs into a parked car carrying one of such lights on the front bumper; to provide a lamp bracket of simple, sturdy design, which will yield to impact and automatically and accurately return to the proper lamp carrying position; to provide such a bracket in an inexpensive, readily manufactured and assembled, practical and durable form.

The foregoing and other desirable objects are attained in the present invention by the novel features of construction, combination and relation of parts, all as hereinafter set forth and broadly covered in claims appended.

The drawing accompanying and forming part of the following specification illustrates one practical commercial embodiment of the invention. Structure however may be modified and changed as regards such illustration, all within the true intent and broad scope of the invention as hereinafter defined and claimed.

Fig. 1 is a side elevation of one of the new yieldable lamp brackets with the lamp broken away for lack of space, the bumper on which the bracket is mounted being indicated in section and broken lines illustrating the yielding action of the bracket.

Figs. 2 and 3 are rear and front views respectively of the bracket.

The invention comprises a base adapted for mounting on a bumper bar or the like, and a lamp carrying arm or post yieldingly mounted on the base and normally held in a proper lamp carrying position.

The base, as appears in the several views, is a channel or substantially U-shaped structure having a substantially flat bottom 5, upstanding substantially parallel sides 6—6 and an upright front wall 7. This base is held in position on the bumper or other support 8, by a bolt 9, and nut 10, arranged for securing a clamp 11, about the support.

The lamp carrying post 12, is shown as a hollow channeled cross-section piece having substantially parallel sides 13, engaged over the sides 6, of the base and pivotally held thereto by rivets or equivalent fastenings 14.

The hollow channel form post is shown as forwardly rounded in streamline form and as terminating in a shoulder 15, forming a stop and engageable with the upper edge of the front 7, of the base. The top of the post is indicated as rounded to form a seat 16, for the universal adjustable mounting of the lamp casing 17, thereon.

The lamp carrying post is yieldably supported and thrust forward to the position determined by engagement of cooperating stops 15 and 17, by spring 18, here shown as a longitudinally tapering leaf spring having a flat base portion 19, secured over the flat bottom 5, of the base by the overstanding head 20, of the bolt and an angularly deflected upstanding portion extending from in front of the bolt head, back of the front wall 7, upwardly within the channel of the post and slidingly engaging the latter at a point near the upper end of the same.

The sides 6 of the base are shown as stepped downward at the rear at 21, to form shoulders engageable by inwardly struck lower edges 22, of the sides of the channel post, thus to serve as stops limiting the extent of backward yielding movement of the lamp support.

The channel or U-shaped base and the channel or cross-section shaped post can be inexpensively produced of sheet metal stock. The base forms a housing concealing the bolt head and containing the angled base portion of the spring. The front wall 7, of the base covers and protects the spring and forms a stop determining the upright position of the yieldingly mounted post. The cooperating back stops 21, 22, prevent such extreme yielding movement as might injure the spring. While practical to make the spring of flat strip stock as indicated, coiled or other forms of springs may be employed. The spring while strong enough to firmly maintain the lamp in upright position and to prevent rattling, is sufficiently yieldable to enable the lamp to rock back immediately on impact by any other object, such as a backing car or the like. The structure as a whole is simple and sturdy and does not in any way interfere with mounting of the bracket in the customary manner. The channeled construction of the base and lamp carrying arm provide housing for the spring and streamline the structure sufficiently for wind resistance elimination. The single bolt serves both for clamping purposes and for fastening the spring in place.

It is to be noted that in returning the hinged lamp post back to previously adjusted position, the invention serves to maintain the lamp aimed or focused in the manner required by various state laws. Thus the invention answers certain safety requirements as to maintaining lights in condition to avoid interference to on-coming drivers.

What is claimed is:

1. A lamp bracket of the character disclosed, comprising a base and a lamp carrying post, said base having upstanding sides and a front wall, said post being of channel form and having sides overlapping the sides of said base and a front portion overstanding and engageable with the front wall of the base, means pivotally connecting said overlapping side portions of the post with said sides of the base, means at the upper end of said post for mounting a lamp thereon, a flat leaf spring having a base portion disposed between the sides of said base and extending angularly upward back of the front wall of the base into engagement with the back of the channel of the post and tensioned to rock the post upwardly and forwardly to a point determined by engagement of the front portion of the post with said upstanding front wall of the base and a clamp bolt for securing said lamp bracket in position, said clamp bolt extending through the base portion of said spring for securing the latter to the base.

2. A lamp bracket of the character disclosed, comprising a base and a lamp carrying post, said base having upstanding sides and a front wall, said post being of channel form and having sides overlapping the sides of said base and a front portion overstanding and engageable with the front wall of the base, means pivotally connecting said overlapping side portions of the post with said sides of the base, means at the upper end of said post for mounting a lamp thereon and a bowed longitudinally tapered flat spring having a base portion secured over the base between the sides and behind the front of the base and an upwardly projecting free portion within the channel of the post and slidingly engaging the back of said channel adjacent the upper end of the post.

3. A lamp bracket of the character disclosed, comprising a base and a lamp carrying post, said base having upstanding sides and a front wall, said post being of channel form and having sides overlapping the sides of said base and a front portion overstanding and engageable with the front wall of the base, means pivotally connecting said overlapping side portions of the post with said sides of the base, means at the upper end of said post for mounting a lamp thereon and spring means housed within said sides of the base and the sides of the channel post and tensioned to rock the post upwardly and forwardly to a point determined by engagement of the front portion of the post with said upstanding front wall of the base and means for clamping said base in position on a bumper bar or the like, and including a single bolt, said spring being engaged and held by said clamp bolt.

4. A supporting bracket for automobile head lamps, comprising a hollow base structure for mounting on an automobile, a hollow lamp carrying post hingedly mounted on said base on a fixed axis disposed to permit such post to drop back in the event of collision, a flat leaf spring having a base portion secured in flat engagement on said hollow base structure and an upwardly projecting free portion extending up within the hollow post and engaging the inner forward wall of said hollow post at a point near the upper end of the same for thrusting said hinged post forwardly and cooperating stops on said base structure and post to relocate a lamp carried by said hinged post in the position to which it has been previously adjusted to avoid interference with on-coming traffic.

HAROLD Z. BENTON.